Figure 12:
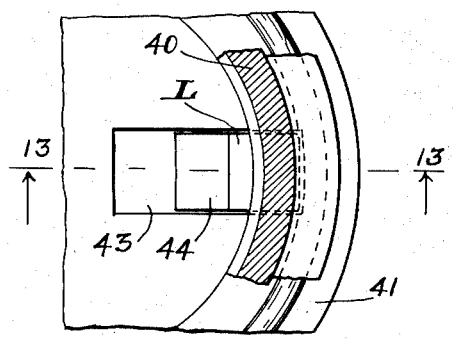

Oct. 27, 1953 — R. G. TILLOU — 2,656,937
SHOCK ABSORBING MECHANISM FOR RAILWAY DRAFT RIGGINGS
Filed Aug. 1, 1952 — 3 Sheets-Sheet 1
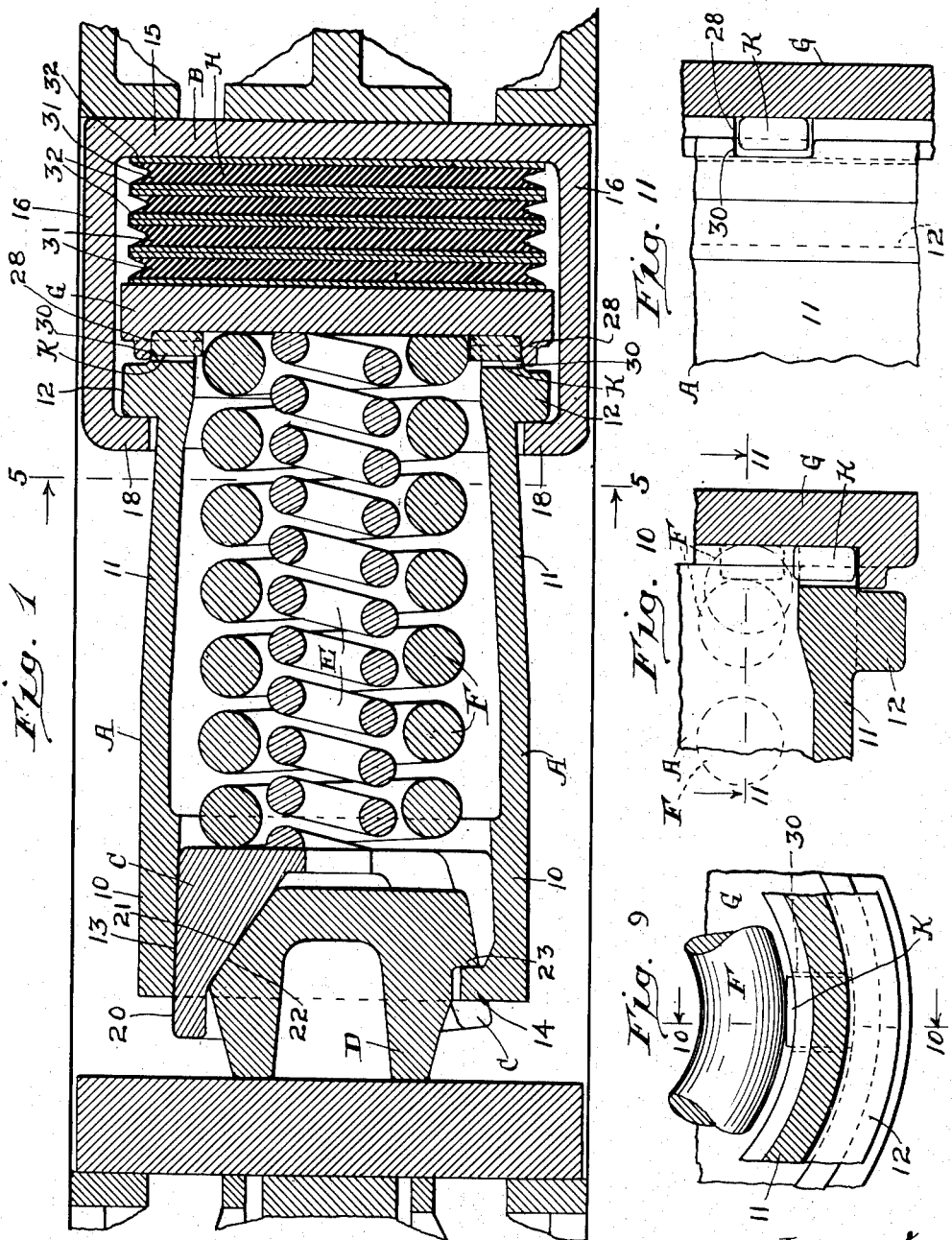
Inventor:
Richard G. Tillou.
By Henry Fuchs
Atty.

Oct. 27, 1953  R. G. TILLOU  2,656,937
SHOCK ABSORBING MECHANISM FOR RAILWAY DRAFT RIGGINGS
Filed Aug. 1, 1952  3 Sheets-Sheet 2
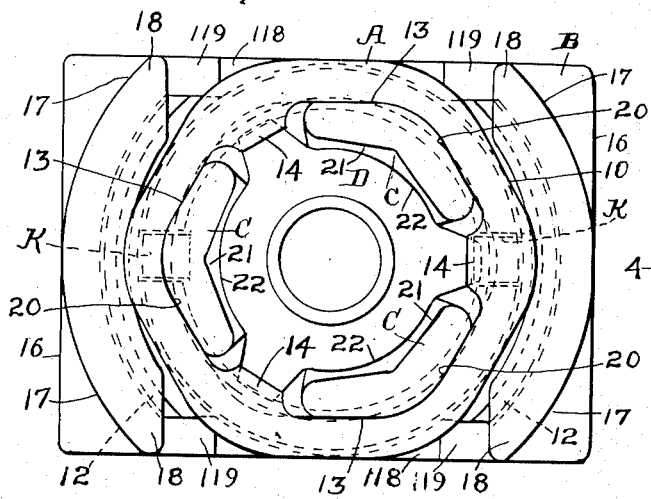
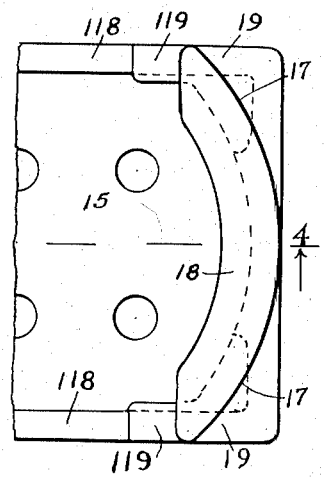
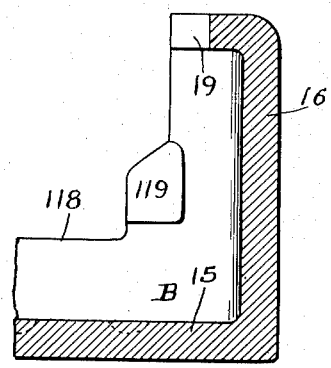
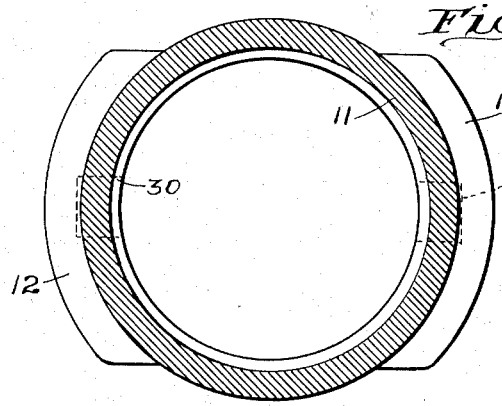
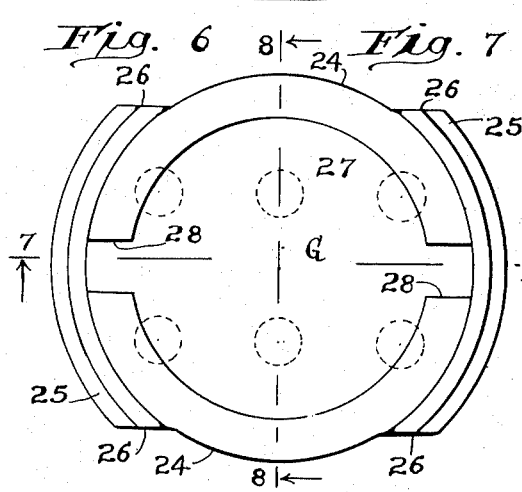
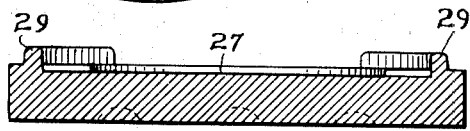
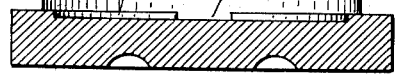
Inventor:
Richard G. Tillou.
By Henry Fuchs
Atty.

Oct. 27, 1953 R. G. TILLOU 2,656,937
SHOCK ABSORBING MECHANISM FOR RAILWAY DRAFT RIGGINGS
Filed Aug. 1, 1952 3 Sheets-Sheet 3

Inventor:
Richard G. Tillou.
By Henry Fuchs
Atty

Patented Oct. 27, 1953

2,656,937

UNITED STATES PATENT OFFICE 2,656,937

SHOCK ABSORBING MECHANISM FOR RAILWAY DRAFT RIGGINGS

Richard G. Tillou, Lombard, Ill., assignor to W. H. Miner, Inc., Chicago, Ill., a corporation of Delaware Application August 1, 1952, Serial No. 302,031

6 Claims. (Cl. 213—34)

1

This invention relates to improvements in combined rubber and friction shock absorbing mechanisms, especially adapted for railway draft riggings.

One object of the invention is to provide a shock absorbing mechanism of the character indicated, comprising a friction casing, a friction clutch telescoped within the front end of the casing in frictional engagement with the interior walls of the same, inner and outer coil springs within the casing yieldingly opposing inward movement of the clutch, a rear follower member at the rear end of the casing, movable lengthwise with respect to the casing and having forwardly projecting arms engageable with the lugs on the casing for limiting rearward movement of the follower member with respect to the casing, a follower plate bearing on the rear end of the casing which is open so as to have the springs bear on the follower plate, and a rubber cushioning element interposed between the follower plate and the rear follower member to cushion relative movements of the casing and follower member, wherein the casing is locked against rotation with respect to the rear follower member to prevent accidental disengagement of the lugs of said rear follower member from the casing, the follower plate interfitting with the rear follower member to hold these parts against relative rotation, and the casing, in turn, being held against rotation with respect to the follower plate by simple and efficient locking means providing a rugged connection between these parts.

A more specific object of the invention is to provide a mechanism as set forth in the preceding paragraph, wherein the locking means between the casing and follower plate is in the form of a separate key engaged in seats in the casing and follower plate, whereby a more rugged and reliable lock is had than in known prior devices of this character having interengaging lugs and seats on the follower plate and casing, in that deeper locking engagement is provided by the separate key engaged in seats than by the lug and seat arrangement referred to in which the depth of the locking engagement is definitely restricted in accordance with the extent to which the rubber cushioning element may be compressed.

A further object of the invention is to provide a mechanism as hereinbefore set forth, wherein the outer coil spring functions to hold the locking key against removal.

Other objects of the invention will more clearly appear from the description and claims hereinafter following.

2

Figure 14:
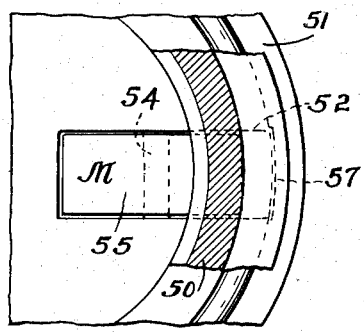
Figure 13:
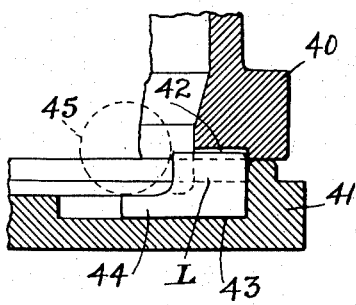
Figure 15:
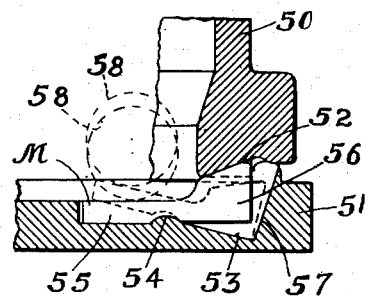

In the accompanying drawings forming a part of this specification, Figure 1 is a horizontal, longitudinal sectional view of my improved shock absorbing mechanism, illustrating the same as disposed within the usual yoke and in position between the draft lugs of a railway draft rigging, the location of the draft sills being diagrammatically indicated by straight lines. Figure 2 is a front elevational view of the shock absorbing mechanism shown in Figure 1. Figure 3 is a broken, front elevational view of the rear follower member shown in Figure 1, showing the right hand side portion of said follower member. Figure 4 is a transverse sectional view, corresponding substantially to the line 4—4 of Figure 3. Figure 5 is a transverse sectional view, through the friction casing of my improved mechanism, corresponding substantially to the line 5—5 of Figure 1. Figure 6 is a front elevational view of the follower plate of my improved mechanism. Figures 7 and 8 are sectional views, corresponding respectively to the lines 7—7 and 8—8 of Figure 6. Figure 9 is a fragmentary sectional view, on an enlarged scale, showing those portions of the friction casing, follower plate, and outer coil spring of the mechanism at the zone of the keyed connection between the casing and the follower plate. Figure 10 is a sectional view, corresponding substantially to the line 10—10 of Figure 9, showing the key in elevation, illustrating the locking position of the outer coil spring in dotted lines and further showing in dotted lines the positions of the key and the outer coil spring, with the locking key disengaged from the key seats of the casing and follower plate. Figure 11 is a sectional view, corresponding substantially to the line 11—11 of Figure 10. Figure 12 is a view similar to Figure 9, illustrating another embodiment of the invention. Figure 13 is a sectional view, corresponding substantially to the line 13—13 of Figure 12, the key being shown in elevation and the outer coil spring indicated in dotted lines. Figure 14 is a view similar to Figure 12, illustrating still another embodiment of the invention. Figure 15 is a sectional view, corresponding substantially to the line 15—15 of Figure 14, showing the outer coil spring in locking position in dotted lines and further illustrating in dotted lines the positions of the outer coil spring and the locking key with the locking key disengaged from the key seat of the friction casing.

Referring first to the embodiment of the invention illustrated in Figures 1 to 11 inclusive, my improved shock absorbing mechanism comprises broadly a friction casing A, a rear follower member B, a set of three friction shoes C—C—C slidable in the casing, a wedge block D in wedging engagement with the shoes, inner and outer coil springs E and F within the casing, an auxiliary follower plate G bearing on the rear end of the casing, a rubber cushioning element H interposed and reacting between the auxiliary follower plate G and the rear follower member B, and locking keys K—K securing the casing A to the follower plate G.

The friction casing A is in the form of a hollow tubular member open at its front and rear ends. The front end portion of the casing is of hexagonal transverse cross section and provides the friction shell portion of the casing, which shell portion is indicated by 10. The portion of the casing, rearwardly of the friction shell portion 10, is of cylindrical cross section and provides a spring cage member 11. At opposite sides of the open rear end thereof, the casing A is provided with relatively heavy, laterally projecting, arc-shaped retaining lugs 12—12 forming limiting stops for the rear follower member B, as hereinafter described. These locking lugs terminate short of the rear end of the casing A, as shown in Figure 1, to relieve the lugs from strain during compression of the mechanism as the pressure is transmitted from the casing A to the auxiliary follower plate G. The hexagonal friction shell portion 10 of the casing A presents three interior, rearwardly converging friction surfaces 13—13—13, which are of V-shaped transverse cross section. At the outer end, the friction shell portion of the casing A is provided with three inturned stop lugs 14—14—14, which are alternated with the friction surfaces of said shell portion.

The rear follower member B comprises a relatively heavy vertical rear wall 15 and forwardly projecting side walls or arms 16—16 extending from opposite ends of said rear wall. The side walls or arms 16 overlap the rear end of the casing A and terminate in curved wall sections 17—17 provided with inturned flanges 18—18 at their outer ends in back of which the lugs 12—12 of the casing A are engaged, thus connecting the follower member B to the casing and restricting rearward movement of said member. The side walls or arms 16—16 of the follower member B are connected by top and bottom walls 118—118, the midsections of which are cut out at the forward end portion of said follower member to provide projecting top and bottom flanges 19—19 and 19—19, as shown most clearly in Figures 3 and 4, thus leaving the follower member B open at the top and bottom sides thereof between these flanges. As further shown in Figure 3, the top and bottom flanges 19—19 have inwardly extending guide projections 119—119 at the inner end portions thereof.

The friction shoes C are three in number and are telescoped within the casing A. Each shoe C is provided with a longitudinally extending, V-shaped friction surface 20 on its outer side in sliding engagement with the corresponding friction surface 13 of the casing A. On its inner side, each shoe has a V-shaped wedge face 21.

The wedge block D has three V-shaped wedge faces 22—22—22 at its inner end, arranged symmetrically about the central longitudinal axis of the casing A and engaging respectively the wedge 21—21—21 of the three shoes C—C—C. The wedge block D further has three radially outwardly extending stop lugs 23—23—23 which extend between adjacent shoes and are engaged in back of the stop lugs 14—14—14 of the casing A to limit outward movement of the wedge block D and thus hold the parts of the friction shock absorbing mechanism assembled.

The springs E and F are disposed within the casing A and together form the main spring resistance of the mechanism. Each of these springs is in the form of a helical coil, having its opposite ends bearing on the inner ends of the shoes C and the auxiliary follower plate G, respectively.

The auxiliary follower plate G is in the form of an oblong member of the outline shown in Figure 6. As shown in this figure, the top and bottom edge portions are rounded or curved upwardly and downwardly at the midportion of said plate, as indicated at 24—24, and the plate presents wing portions 25—25 at opposite sides thereof beyond said curved portions 24—24. The top and bottom ends of the wing portions 25—25 present horizontal ledges 26—26, the wings being of such a height that they slidingly fit between the top and bottom guide projections 119—119 and 119—119 of the flanges 19—19 and 19—19 of the follower member B to properly guide the auxiliary follower plate within the rear follower member B.

The main body portion of the follower plate G is depressed at its forward side to provide a central seat 27 for the rear ends of the springs E and F. At diametrically opposite portions thereof, the front side of the follower plate G, outwardly of the seat 27, is slotted to provide key seats 28—28 which open into the seat 27, and are closed at their outer ends by arcuate ribs 29—29 on the wing portions 25—25 of said follower plate, which extend from top to bottom of said wing portions, and project beyond the face of said follower plate and are offset inwardly from the curved edge portions of said wings. At the inner end portion thereof, the side walls of the spring cage member 11 of the casing A are slotted at diametrically opposite sides of the mechanism, as shown in Figures 1, 2, 9, 10, and 11, to provide key seats 30—30 in alignment with the key seats 28—28 of the follower plate G.

The casing A and the follower plate G are locked together against relative rotation by the keys K—K, which are engaged in seats 28 and 30 of said follower plate G and casing A. As will be evident upon reference to Figures 1, 9, and 10, in the assembled condition of the mechanism, the spring F blocks the keys K—K against accidental removal.

The rubber cushioning element H, which is interposed between the auxiliary follower plate G and the rear follower member B bears at its front and rear ends, respectively, on said auxiliary follower plate G and the wall 15 of the follower member B. This cushioning element, as illustrated in the drawings, comprises a plurality of units arranged in series, each unit being composed of a rubber mat 31, embraced by front and rear spacing plates 32—32.

In assembling the mechanism, the rear follower member B is placed on a suitable horizontal support, with the rear side thereof, that is, the wall 15 resting flatly on said support so that the side walls or arms 16—16 thereof are in upstanding position. Preferably, the entire assembling operation is performed while the rear follower member B is in this upstanding position. The cushioning unit H is first placed within the follower member B, between the arms 16—16, the auxiliary follower plate G is then placed within the follower member B by entering the same between the arms 16—16, turned in position so that the wing portions 25—25 thereof are aligned with the openings between the flanges 19—19 and 19—19 at opposite sides of the rear follower member B. After the auxiliary follower plate G has been brought to a position in back of the flanges 18—18 of the rear follower member B, it is rotated through 90 degrees, thereby bringing it into the position shown in Figures 1, 2, 9, 10, and 11. It is then seated on the cushioning element H. The casing A, in upright position, with the outer coil spring F arranged therein, is then placed on top of the auxiliary follower plate G. In placing the casing A on the follower plate G, the casing is turned so that the lugs 12—12 thereof register with the openings between the opposed flanges 19—19 and 19—19 of the follower member B, whereby these lugs will pass freely between the flanges 19—19 and 19—19 and will be positioned to engage in back of the flanges 18—18 when the casing A is rotated through an arc of 90 degrees about its longitudinal axis. After the casing A has been placed in this position, the rubber cushioning element H is compressed by depressing the auxiliary follower plate G by a suitable tool, such as a plunger or bar extending into the casing A. The auxiliary follower plate G, with the casing A resting thereon, is depressed until the lugs 12—12 of the casing pass below the level of the flanges 18—18 of the rear follower member B. The auxiliary follower plate G is then depressed a little further so that the lugs 12—12 of the casing A can ride on the ribs 29—29 of the auxiliary follower plate when the casing is rotated. With the parts thus positioned, the casing A is rotated through an arc of 90 degrees, bringing the lugs 12—12 in back of the flanges 18—18 and bringing the key seats 30—30 of the casing A into registration with the key seats 28—28 of the auxiliary follower plate G. The pressure is then withdrawn from the auxiliary follower plate G, permitting the rubber cushioning element A to expand and bringing the lugs 12—12 into engagement with the flanges 18—18 of the rear follower member B. With the parts thus positioned, the outer coil spring F is lifted to a position clear of the openings of the key seats 28—28 and 30—30 and the casing locked to the follower plate G by inserting the keys K—K in said seats. After the follower member B has thus been connected to the casing A, the inner coil spring E, shoes C—C—C, and the wedge block D are applied to the casing A by entering all of these parts through the open front end of the casing, the lugs 23—23—23 of the wedge block D being engaged in back of the lugs 14—14—14 of the casing A while the shoes are held in inwardly displaced position by any suitable tool engaged with said shoes, to place the springs E and F under compression. As hereinbefore brought out, the outer coil spring F is assembled with the casing A before connecting the follower member B to said casing. In placing the outer coil spring F within the casing, the former is entered through the open unobstructed rear end of the latter, thereby permitting a maximum diameter coil spring being used, which would not be possible if this spring had to be passed through the front end of the casing, the opening of which is restricted in size due to the inwardly projecting retaining lugs 14—14—14 for the wedge being located there.

The operation of my improved shock absorbing mechanism is as follows: During relative movement of the front follower of the usual draft rigging of a railway car and the friction casing A toward each other, the wedge block D is forced inwardly of the casing A, wedging the shoes C—C—C apart and sliding the same inwardly along the friction surfaces of the casing, against the resistance of the springs E and F. During this action, the pressure is transmitted to the rubber cushioning element H, compressing the same through the follower plate G.

Referring next to the embodiment of the invention illustrated in Figures 12 and 13, a key L of angular shape is employed to lock the casing, which is indicated by 40 and corresponds to the casing A, to the auxiliary follower plate, which is indicated by 41 and corresponds to the auxiliary follower plate G. The side wall of the casing 40 and the follower plate 41 are provided with aligned key seats 42 and 43, respectively, within which the key L is seated. As shown, the seat 43 of the follower plate 41 is of sufficient length to allow the key to be slid to disengaged position with respect to the casing 40. The key L, as shown, is in the form of a block, having an inwardly extending flange at the bottom end portion thereof, forming a shelf 44 on which the outer coil spring 45, indicated in dotted lines and corresponding to the spring F, is seated. Accidental removal of the key L is blocked by the spring 45, which projects beyond the body portion of said block and rests on the shelf 44.

Referring next to the embodiment of the invention illustrated in Figures 14 and 15, a rocking key M is employed to lock the casing, which is indicated by 50 and corresponds to the casing A, to the auxiliary follower plate, which is indicated by 51 and corresponds to the follower plate G. The side wall of the casing 50 and the follower plate 51 are provided with aligned key seats 52 and 53, respectively, within which the key M is seated. As shown, the key seat 53 of the auxiliary follower plate 51 is of considerably greater length than the seat 52 of the casing 50. The bottom wall of the seat 53 at a point between the ends of said seat is provided with an upstanding fulcrum projection 54 on which the key M is adapted to rock. The key M comprises an elongated platelike section 55, having an enlarged head portion 56 at its outer end, adapted to project into the seat 52 of the casing 50 when in the full line position shown in Figure 15. At the outer end portion thereof, the seat 53 is deepened, as indicated at 57, to accommodate the head 56 when the key M is rocked to the dotted line position shown in Figure 15. This depending or depressed portion is of sufficient depth to permit the head 56 to swing downwardly into complete disengaged position with respect to the casing 50, as shown in dotted lines, so that the casing may be rotated with respect to the auxiliary follower plate 51. The coil spring, which is shown in dotted lines in Figure 15 and corresponds to the spring F hereinbefore described, is indicated by 58. In the assembled condition of the mechanism, this spring holds the inner end of the key M in the depressed full line position shown in Figure 15 with the head 56 of said key seated in the seat 52 of the casing 50. When the spring 58 is manually lifted to the uppermost position shown in Figure 15, the key M is freed to be rocked to disengaged position with respect to the casing 50.

I claim:

1. In a combined rubber and friction draft gear, the combination with a friction casing open at its rear end and having stop shoulders at opposite sides of the rear end thereof; of friction shoes slidingly telescoped within the front end of the casing; spring means within the casing yieldingly opposing inward movement of said shoes; a wedge block in wedging engagement with the shoes; a rear follower member having forwardly projecting side arms provided with inturned flanges in shouldered engagement with the stop shoulders of the casing; an auxiliary follower plate bearing on the rear end of the casing and on the rear end of said spring means, said follower plate having a sliding fit within said rear follower member for holding said rear follower member and follower plate against relative rotation; aligned key seats at the rear end of the casing and the forward side of said follower plate; a key engaged in said seats for locking said casing and follower plate against relative rotation; and a rubber cushioning element interposed and reacting between said auxiliary follower plate and rear follower member, said rubber cushioning element being under initial compression.

2. In a combined rubber and friction draft gear, the combination with a friction casing open at its rear end and having stop shoulders at opposite sides of the rear end thereof; of friction shoes slidingly telescoped within the casing; a wedge in wedging engagement with said shoes; a rear follower member having forwardly projecting side arms provided with inturned flanges in shouldered engagement with the stop shoulders of the casing; an auxiliary follower plate bearing on the rear end of the casing, said follower plate having a sliding fit within said rear follower member for holding said rear follower member and follower plate against relative rotation; interengaging locking means on said casing and follower plate for locking said casing and follower plate against relative rotation, said locking means comprising aligned seats in the side wall of the casing and in the follower plate, and a key engaged in said seats; inner and outer coil springs within said casing bearing on said rear follower member, said outer coil spring blocking removal of said key; and a rubber cushioning element interposed between and bearing on said auxiliary follower plate and rear follower member, respectively.

3. In a combined rubber and friction draft gear, the combination with a friction casing; of a friction clutch slidingly telescoped within the casing; laterally projecting stop lugs on said casing at opposite sides of the rear end thereof; a rear follower member having forwardly projecting side arms provided with inturned flanges at their front ends engaged in front of said stop lugs, said lugs and flanges being engageable by relative rotation of said casing and follower member through an angle of 90 degrees; an auxiliary follower plate bearing on the rear end of the casing, said auxiliary follower plate having a sliding fit within said follower member for holding said rear follower member and follower plate against relative rotation; means for locking said casing to the follower plate against relative rotation about the longitudinal axis of the mechanism, comprising a seat in said follower plate, an aligned seat in the wall of the casing, and a key engaged in said seats; inner and outer coil springs in said casing bearing on said clutch and auxiliary follower plate, said outer coil extending past and blocking removal of said key; and a rubber cushioning element interposed and reacting between said auxiliary follower plate and rear follower member, said rubber element being under initial compression.

4. In a combined rubber and friction draft gear, the combination with a friction casing open at its rear end and having a friction clutch slidable therein, said casing having laterally projecting stop lugs at opposite sides of the rear end thereof; a rear follower member having a vertical rear wall and forwardly projecting side arms extending from said wall and provided with inturned flanges at their front ends engaged in front of said stop lugs; an auxiliary follower plate bearing on the rear end of the casing, said follower plate having a sliding fit within said rear follower member for holding said rear follower member and follower plate against relative rotation about the longitudinal axis of the mechanism, said follower plate having key seats at diametrically opposite sides, said casing having key seats at the rear end at diametrically opposite sides thereof aligned with the seats of said follower plate; a key engaged in said seats of the casing and auxiliary follower plate to lock said casing and follower plate against relative rotation with respect to each other, said key projecting forwardly beyond the rear end of said casing; a coil spring within said casing bearing on said clutch and follower plate, said spring extending past said key and blocking removal thereof; and a rubber cushioning element bearing at its front and rear ends on said auxiliary follower plate and rear follower member, said rubber element being under initial compression.

5. In a combined rubber and friction draft gear, the combination with a friction casing open at its rear end and having stop shoulders at opposite sides of said rear end thereof; of friction shoes slidingly telescoped within the casing; a wedge in wedging engagement with said shoes; a rear follower member having forwardly projecting side arms provided with inturned flanges in shouldered engagement with the stop shoulders of the casing; an auxiliary follower plate bearing on the rear end of the casing, said follower plate having a sliding fit within said rear follower member for holding said rear follower member and follower plate against relative rotation; interengaging locking means on said casing and follower plate for locking said casing and plate against relative rotation, said means comprising aligned seats in the side wall of the casing and follower plate, and a key engaging with said seats, said key having an inwardly projecting shelf; inner and outer springs within said casing bearing on said rear follower member, said outer coil bearing on said shelf of the key and blocking removal of said key; and a rubber cushioning element interposed between and bearing on said auxiliary follower plate and rear follower member, respectively.

6. In a combined rubber and friction draft gear, the combination with a friction casing open at its rear end and having stop shoulders at opposite sides of said rear end thereof; of friction shoes slidingly telescoped within the casing; a wedge in wedging engagement with said shoes; a rear follower member having forwardly projecting side arms provided with inturned flanges in shouldered engagement with the stop shoulders of the casing; an auxiliary follower plate bearing on the rear end of the casing, said follower plate having a sliding fit within said rear follower member for holding said rear follower member and follower plate against relative rotation; interengaging locking means on said casing and follower plate for locking said casing and plate against relative rotation, said means comprising aligned seats in the side wall of the casing and follower plate, and a rocking key engaged in said seats, said key being fulcrumed on said plate for swinging movement into engagement with the seat of the casing, said key having an inwardly projecting shelf; inner and outer springs within said casing bearing on said rear follower member, said outer spring bearing on said shelf of the key and blocking removal of said key; and a rubber cushioning element interposed between and bearing on said auxiliary follower plate and rear follower member, respectively.

RICHARD G. TILLOU.

No references cited.